United States Patent [19]

Spletzer et al.

[11] 4,436,470

[45] Mar. 13, 1984

[54] RETORT CRATE LOADER AND UNLOADER

[75] Inventors: Barry L. Spletzer; George Swiatlowski, both of Fremont, Mich.

[73] Assignee: Gerber Products Company, Fremont, Mich.

[21] Appl. No.: 202,218

[22] Filed: Oct. 30, 1980

[51] Int. Cl.³ .............................................. B65G 57/08
[52] U.S. Cl. ......................................... 414/36; 53/150; 414/63; 414/86
[58] Field of Search ........................ 414/35, 36, 86, 91, 414/63, 403; 53/150, 149

[56] References Cited

U.S. PATENT DOCUMENTS

| | | | |
|---|---|---|---|
| 3,612,299 | 10/1971 | Shaw | 414/63 X |
| 3,918,598 | 11/1975 | Van der Meer | 414/35 X |
| 4,029,198 | 6/1977 | Lingl | 198/425 |

*Primary Examiner*—Richard A. Schacher
*Attorney, Agent, or Firm*—Townsend and Townsend

[57] ABSTRACT

A semi-automatic retort crate loader and unloader is disclosed. A standard retort crate is positioned adjacent the outer edge of a dead plate at one end of a conveyor by horizontal positioning assembly which includes a clamp and a pair of crate sensors. A floor cylinder raises and lowers the bottom of the retort crate and the containers therein. Jar load and unload sensors control indexing the floor cylinder to the proper heights for loading and unloading layers of containers into and out of the retort crate. During loading, the horizontal positioning assembly positions the crate so that the inner surface lies underneath the dead plate and behind its outer edge. A jar clamp, located above the dead plate and having a resilient lower surface, clamps jars to the outer edge of the dead plate after the retort crate is filled. The horizontal positioning assembly then moves the carriage and retort crate therewith away from the dead plate a short distance providing seating space for imperfectly clamped jars. The containers are then indexed down one level via the floor cylinder and jar loading sensor. The horizontal positioning assembly then moves the retort crate back under the dead plate. A circular sweep ring having a downwardly and outwardly beveled interior surface is also disclosed. During unloading, the horizontal position assembly, jar unload sensor, floor cylinder and sweep ring combine to position the crate, index the layers of containers and sweep the upper layer onto the conveyor.

7 Claims, 21 Drawing Figures

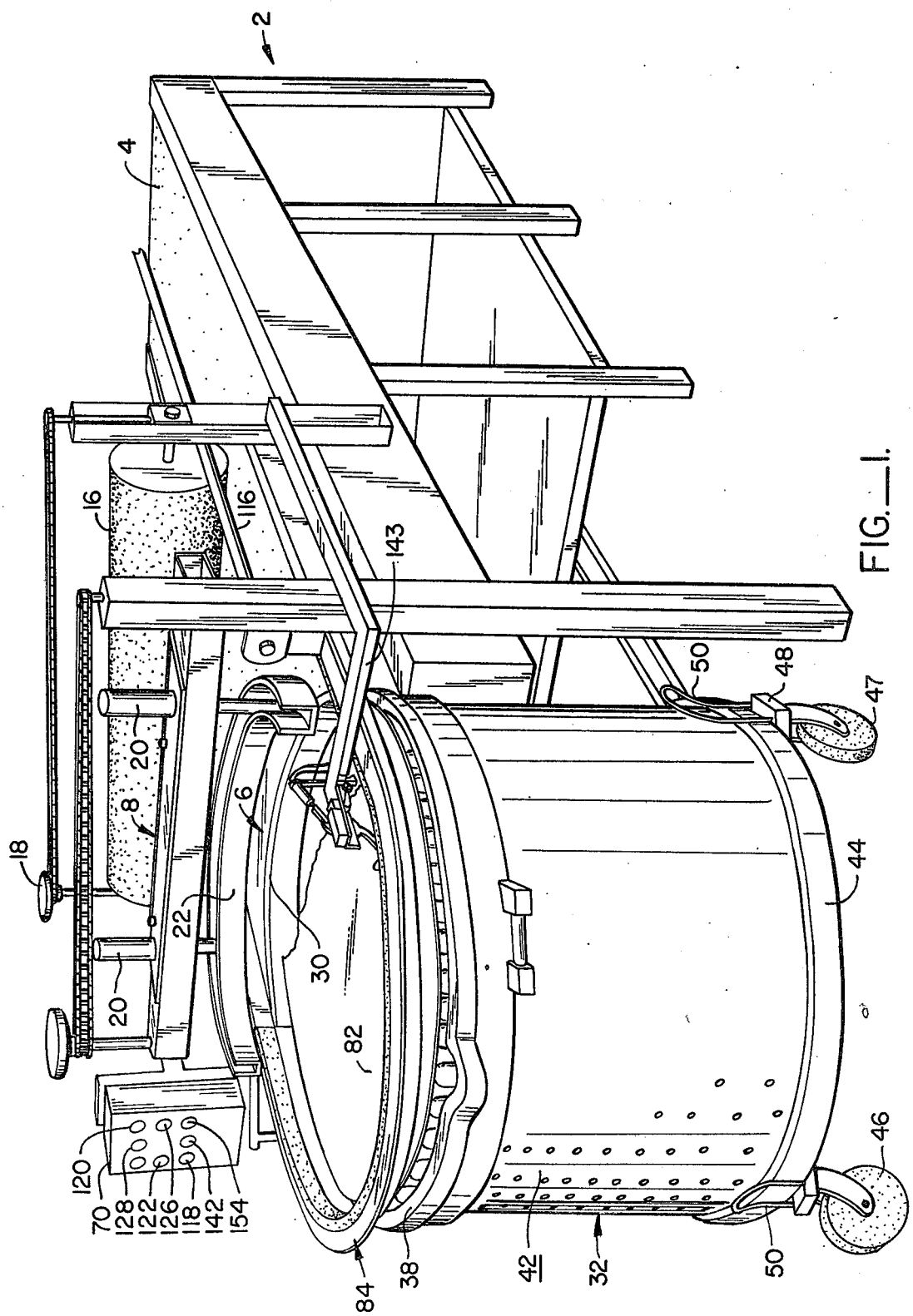
FIG._1.

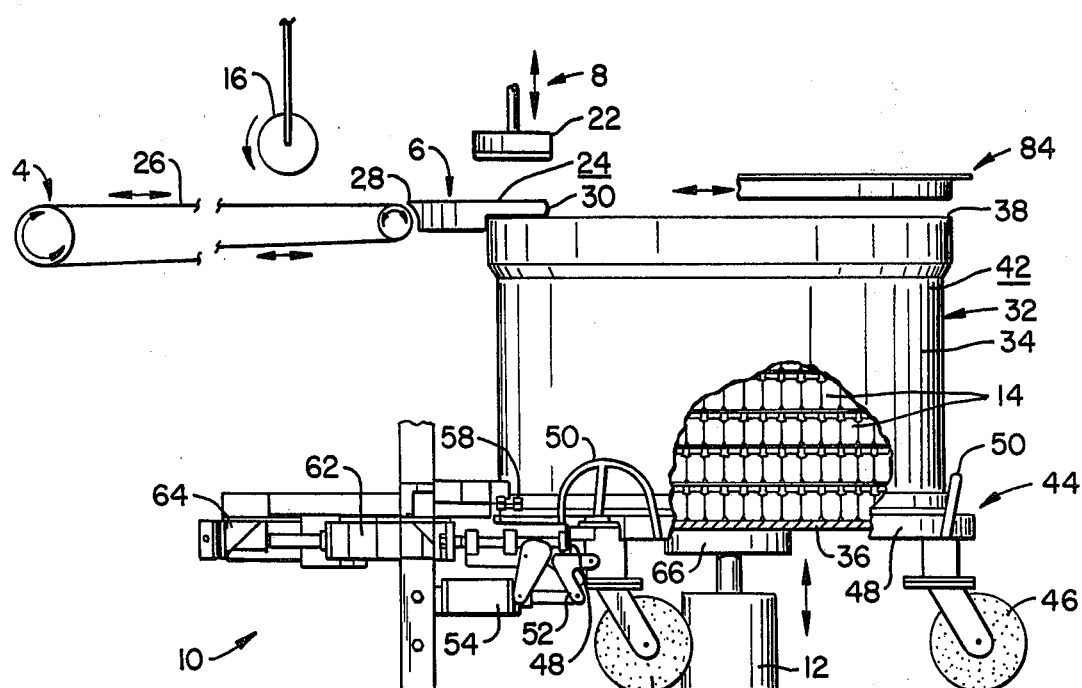
FIG._2.
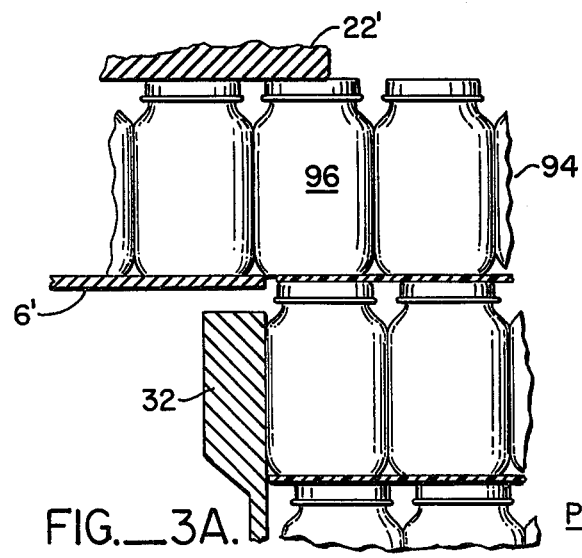
FIG._3A. PRIOR ART
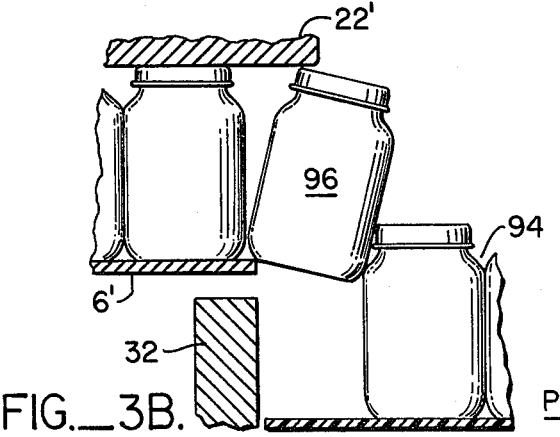
FIG._3B. PRIOR ART

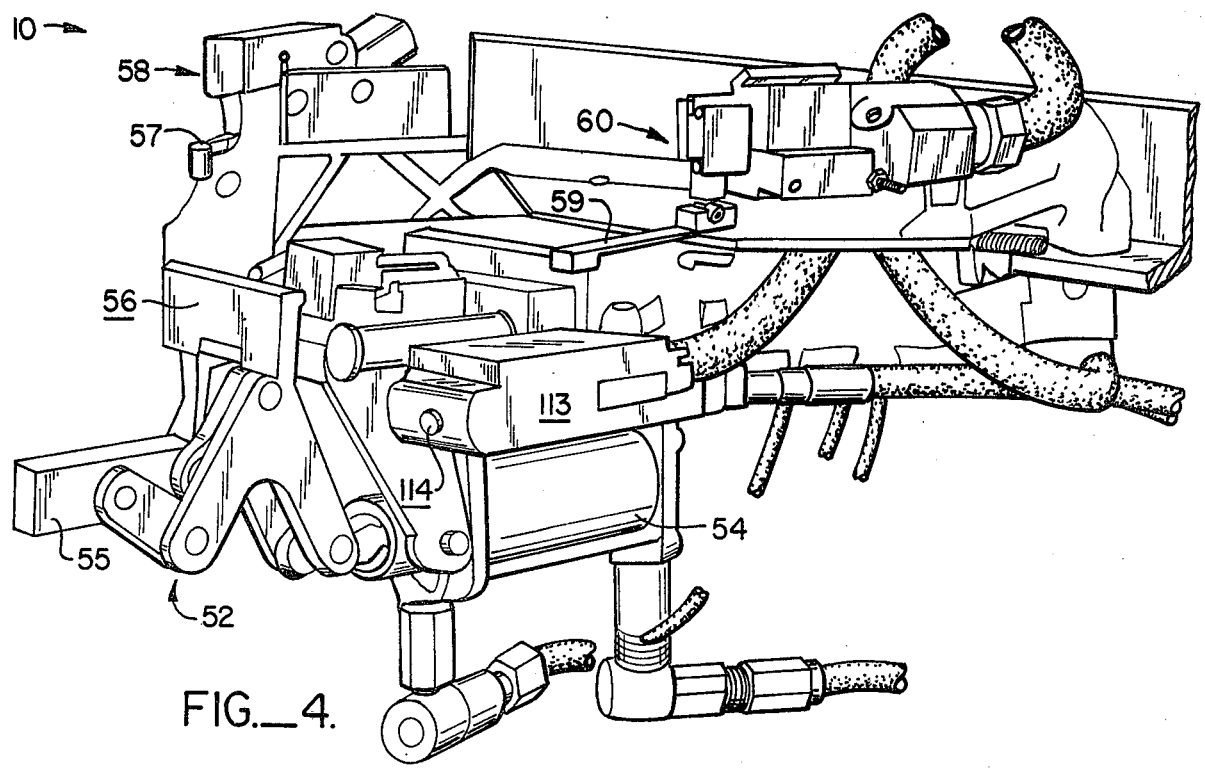
FIG._4.
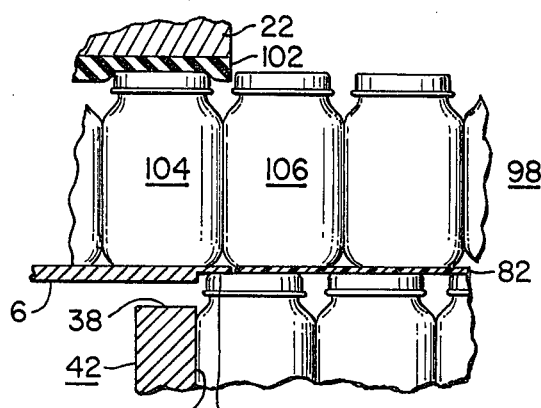
FIG._5A.
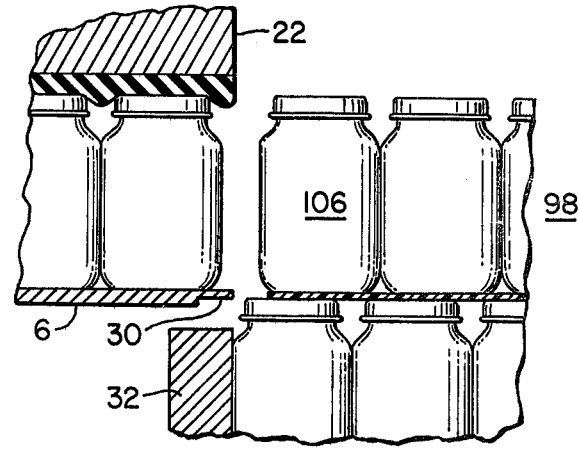
FIG._5B.
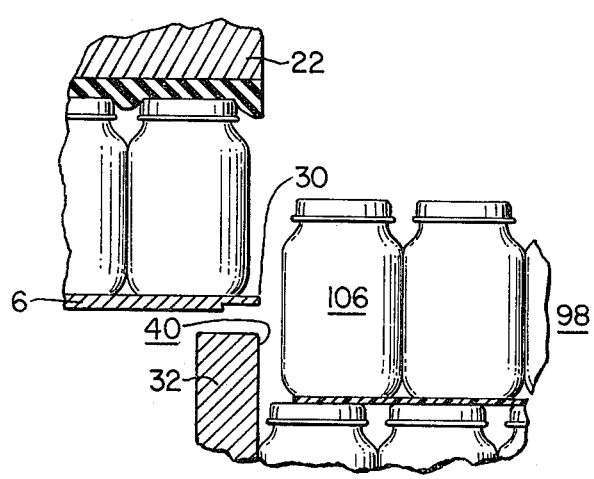
FIG._5C.
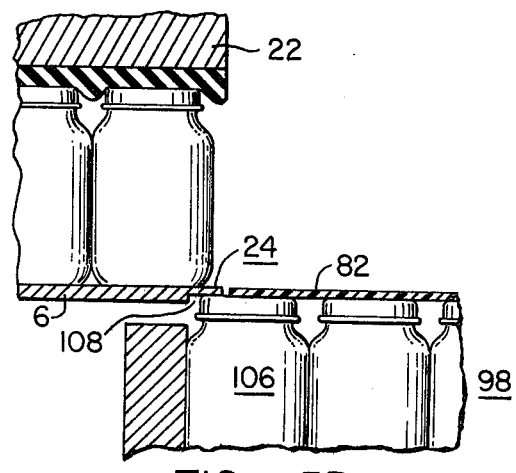
FIG._5D.

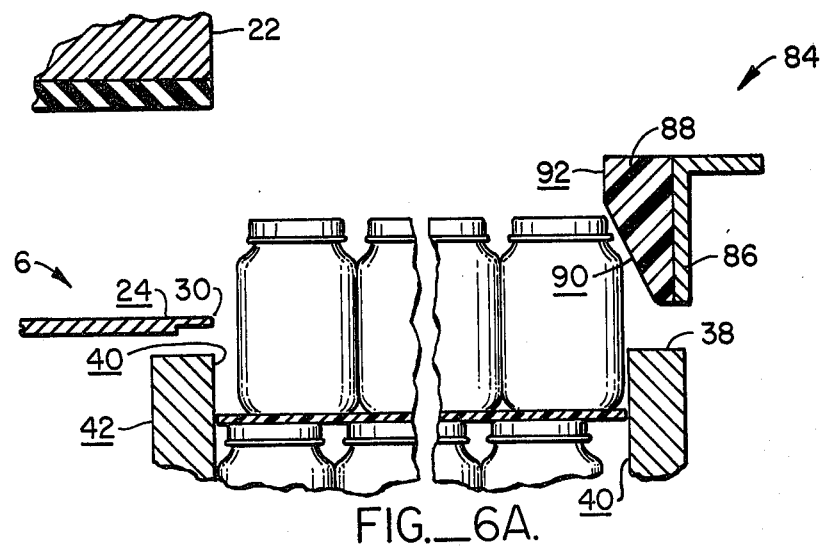
FIG._6A.
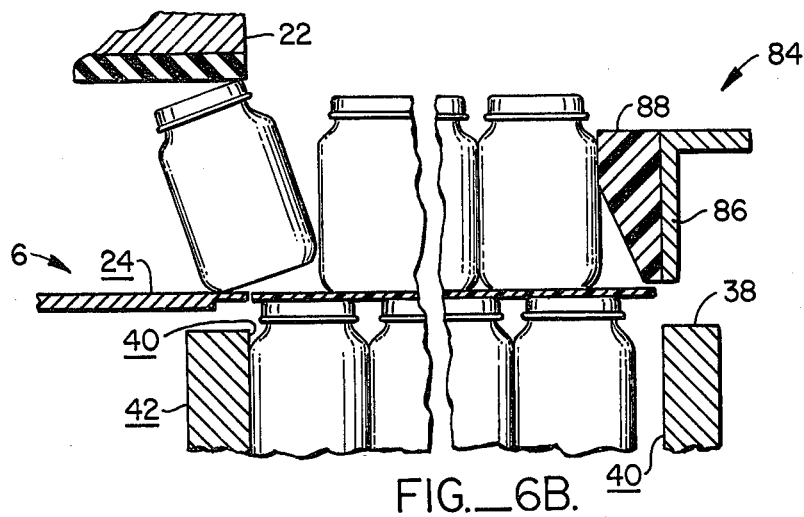
FIG._6B.
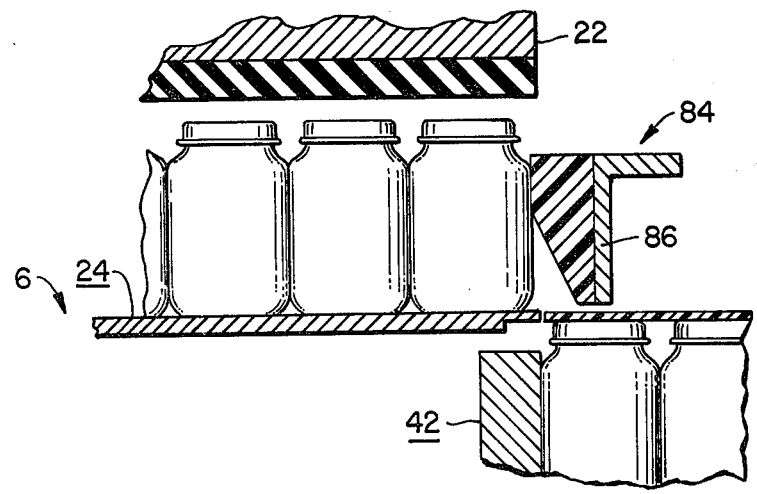
FIG._6C.

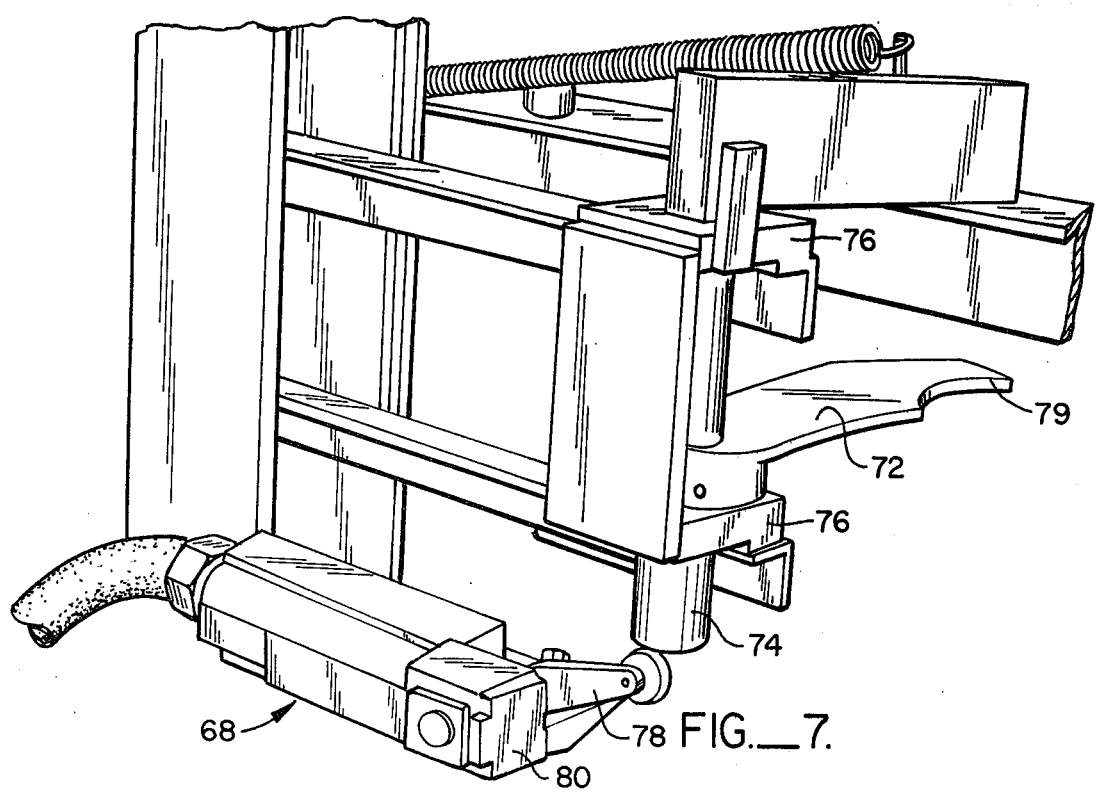
FIG._7.
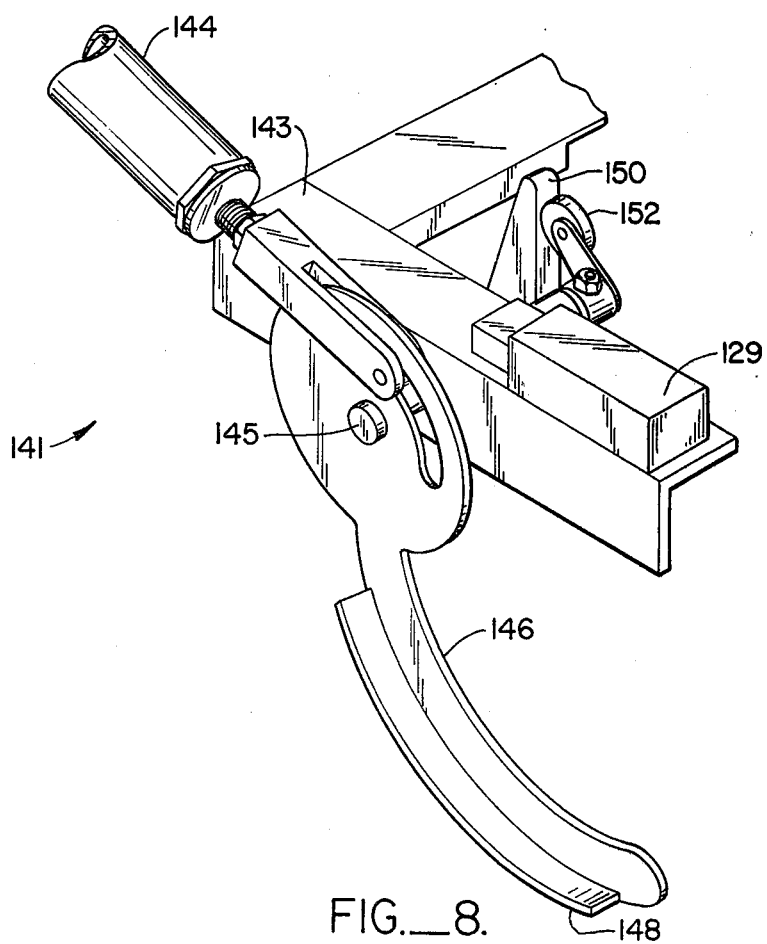
FIG._8.

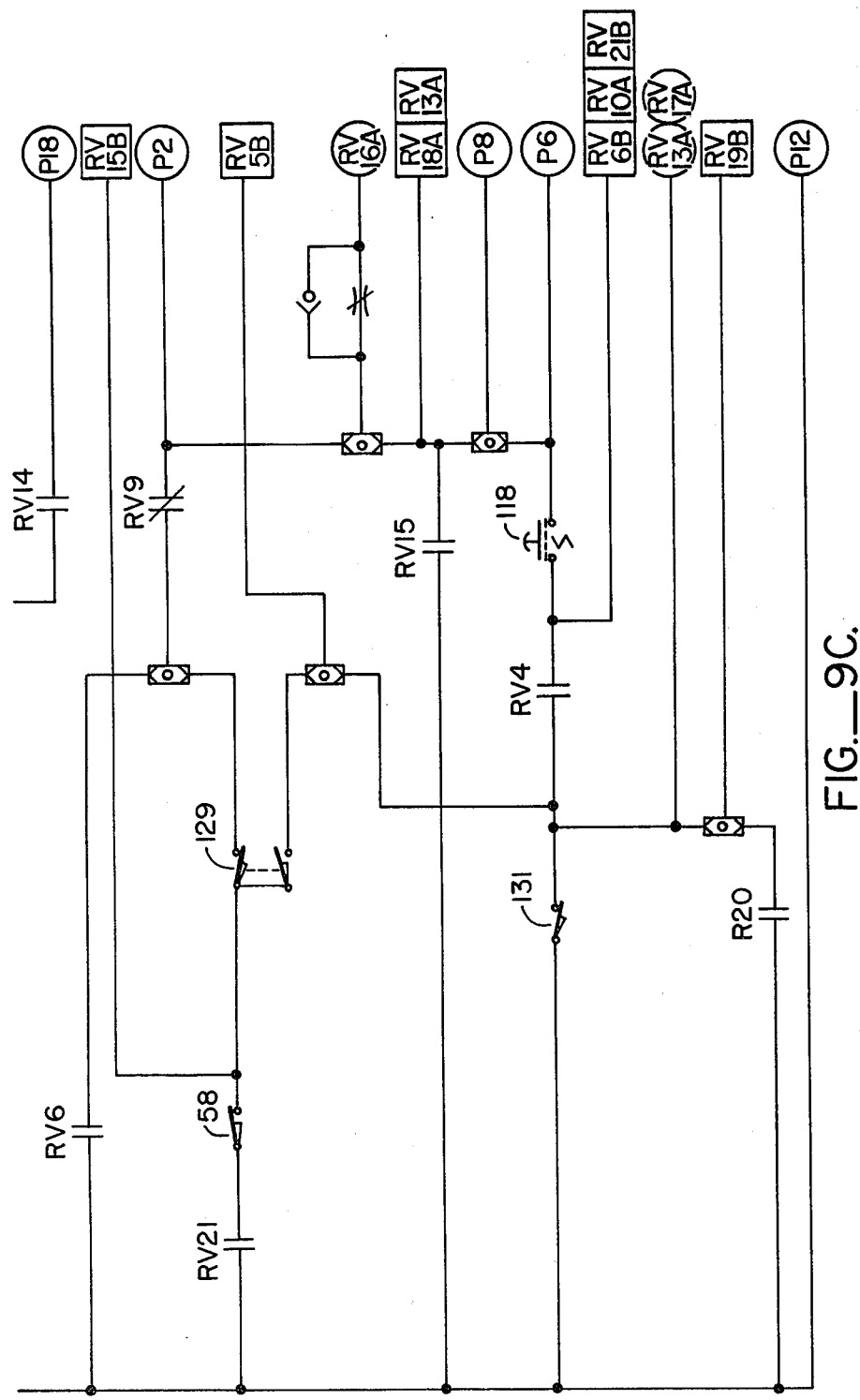
FIG._9C.
| FIG. 9A. |
| FIG. 9B. |
| FIG. 9C. |
FIG._9.

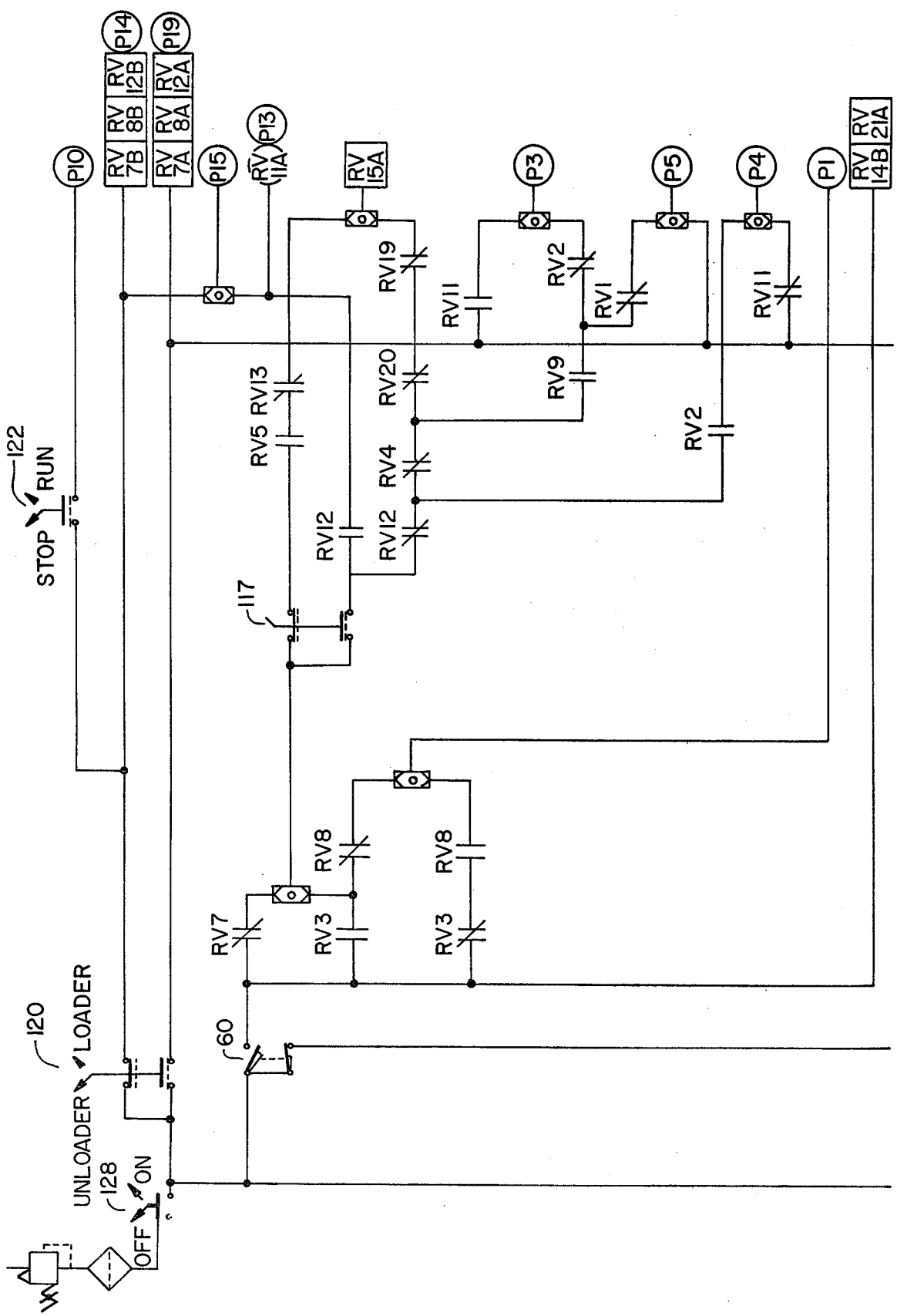
FIG._9A.

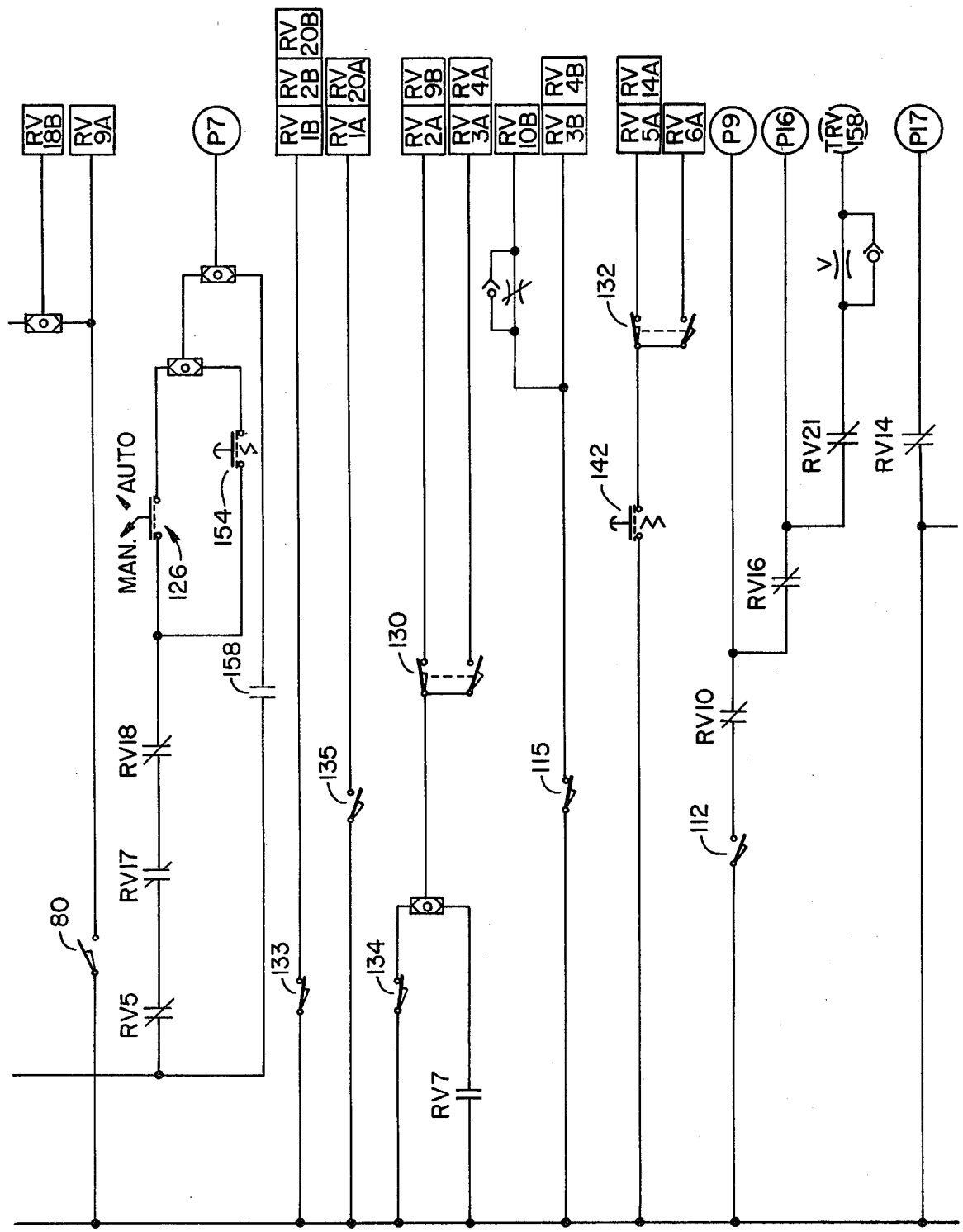
FIG._9B.

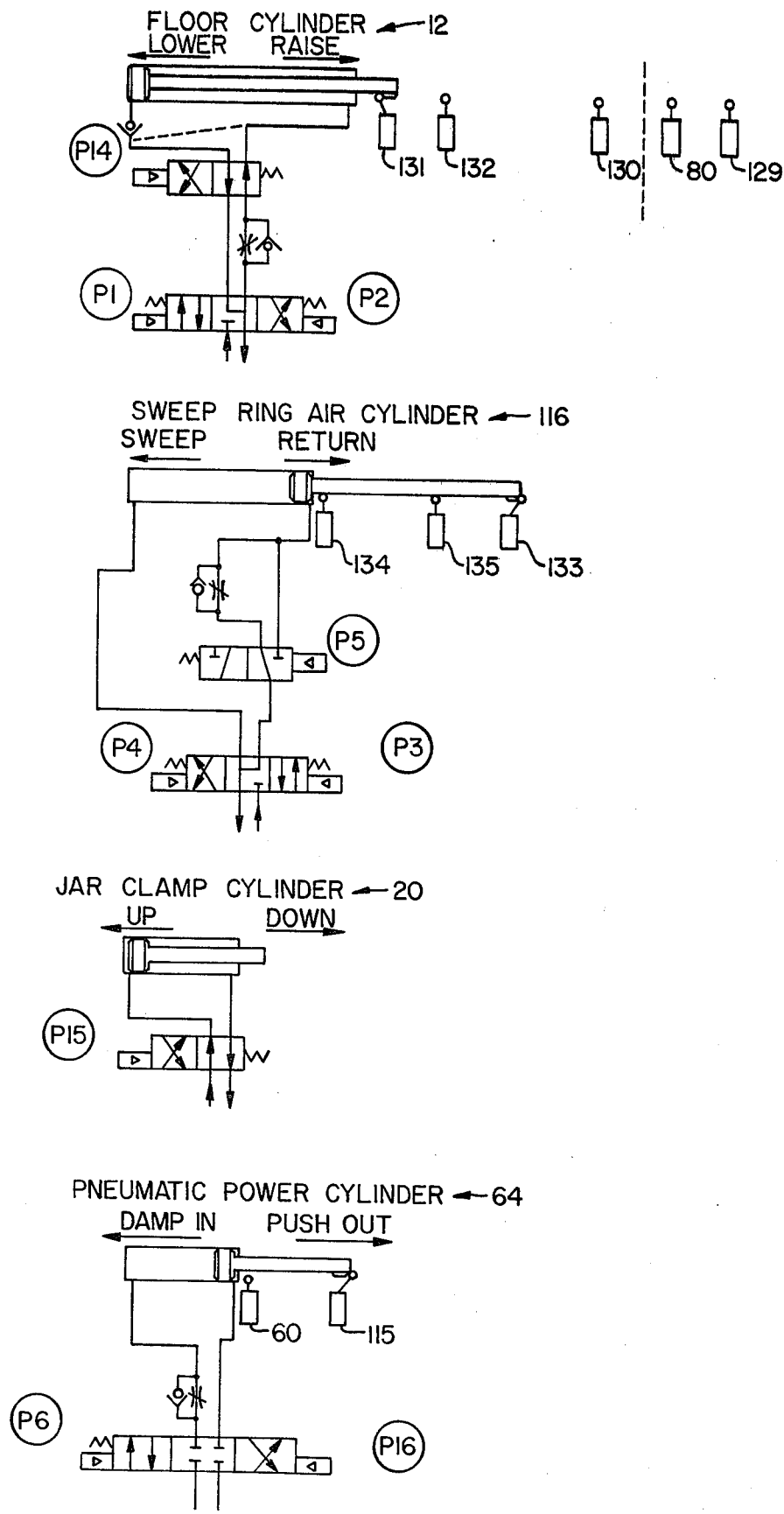
FIG._10A.

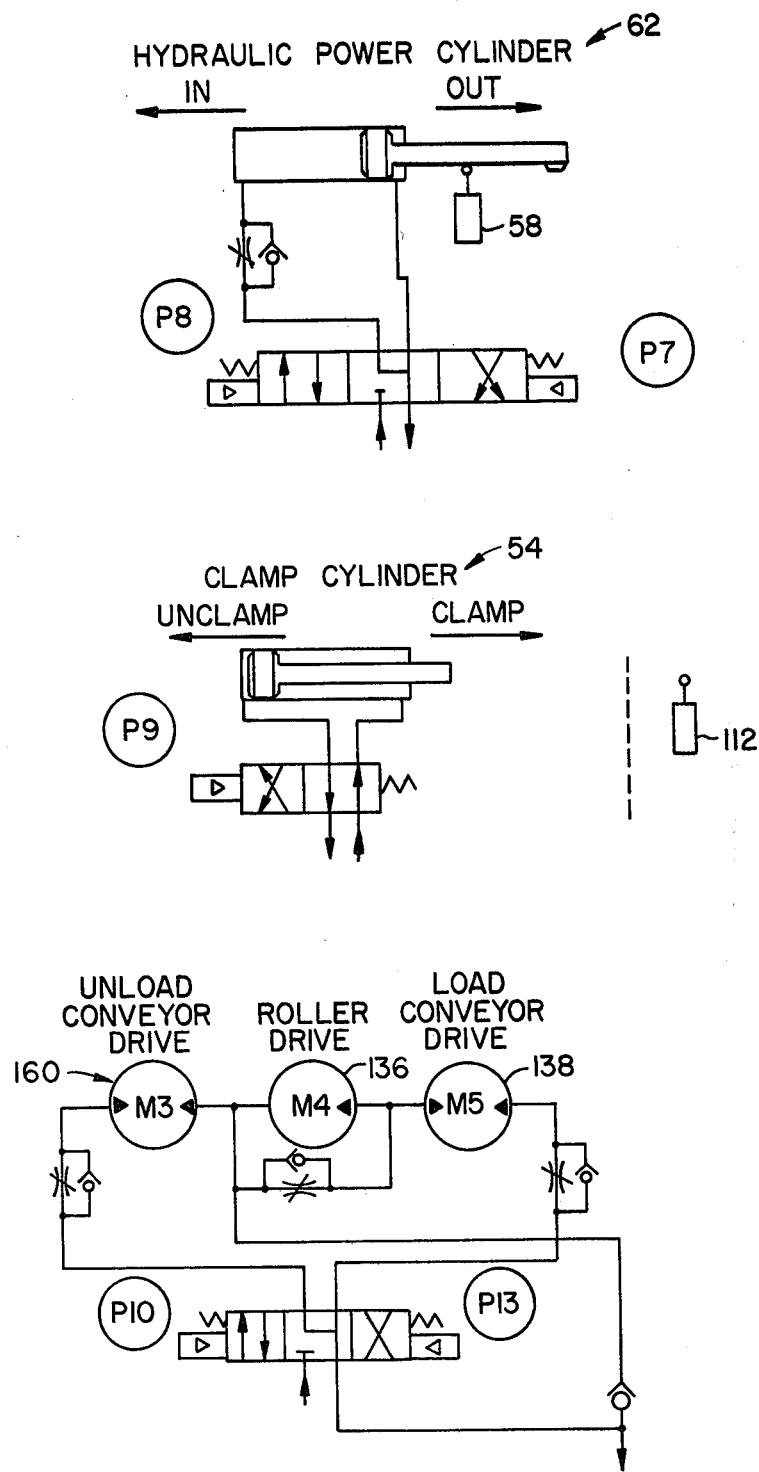
FIG._10B.

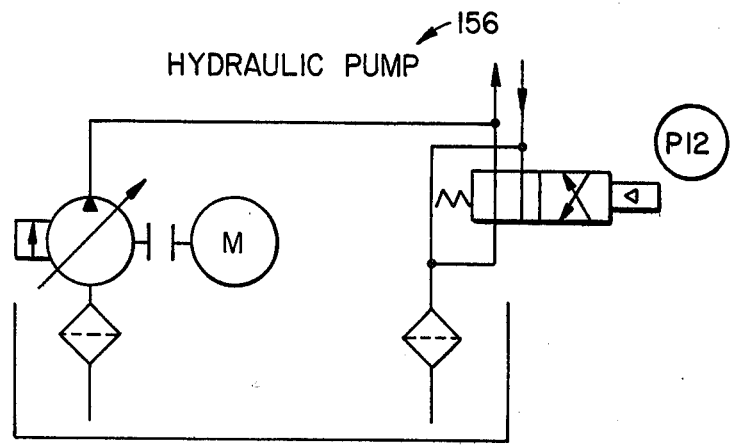
HYDRAULIC PUMP 156
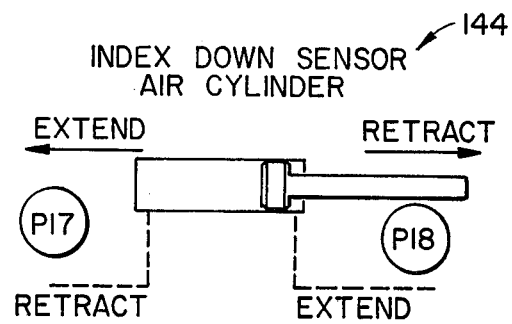
INDEX DOWN SENSOR AIR CYLINDER 144
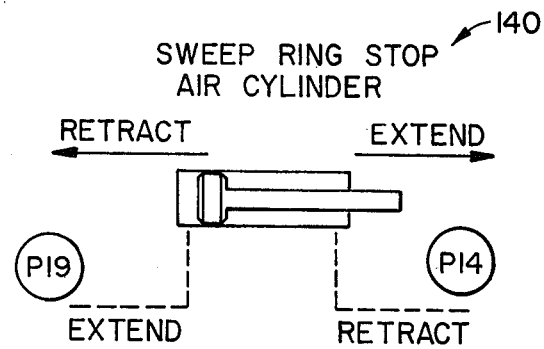
SWEEP RING STOP AIR CYLINDER 140
FIG._10C.

RETORT CRATE LOADER AND UNLOADER

BACKGROUND OF THE INVENTION

In producing canned foods, the filled cans or jars must be heated to prevent spoilage. In commercial operations the cans or jars of food are often loaded within a retort crate; the loaded retort crate is then placed within a heated retort for a specified period of time. Retort crates are typically heavy ferrous cylindrical containers having a lower edge upon which a movable bottom rests. The retort crates have no top. The bottom and sides of the crates are usually perforated to allow the hot water within the retort to flow freely around the containers in the crates.

In the past, one machine has been used for loading layers of jars into the crate and another used for unloading of the jars from the crate after they have been heated in the retort. Such a duplication of equipment is costly and takes a significant amount of valuable floor space in the plant.

Operationally, retort crate loaders load jars into a retort crate from a moving conveyor. At the end of the moving conveyor is a dead plate. A jar clamp is situated above the dead plate. The conveyor moves the jars past the dead plate and into the retort crate where they rest upon a slip sheet or divider which is placed between the layers of jars. After a new layer of jars is filled, the clamp is brought down upon the jars resting on the dead plate. These jar clamps have typically used magnets to hold the jars resting near the edge of the dead plate in place while the newly loaded layer of jars is indexed down one level. However, during recent years the thickness of the metal cap has been reduced to such an extent that the magnets are often no longer effective to securely hold the jars. Therefore, jars which hang over the outer edge of the dead plate often fall into the new layer of jars when the layer is lowered. Since there is generally not room for it, the extra jar, known as a leaner, must be removed by the operator. Such operator intervention causes a break in the normal flow and thus increases the time required to load the jars.

Another problem with the prior art retort crate loaders arises when a jar hangs substantially over the outer end of the dead plate. However, because the lower edge of the jar is rounded, when the newly loaded layer of jars is lowered, this imperfectly clamped jar also becomes a "leaner". Therefore, the operator must again interrupt the flow to accommodate the leaner.

Presently, retort crate loaders require that the operator manually control the vertical index down motion. When doing so the operator lowers the jars past the desired position so that they can be jogged several times, by raising and lowering the jars, to properly settle the jars in place. This is quite time consuming since the operator must hunt for the proper level.

SUMMARY OF THE INVENTION

A semi-automatic retort crate loader and unloader is disclosed. A standard, cylindrical retort crate having a movable bottom is supported on a wheeled carriage. A reversible conveyor having a dead plate at its outer end moves filled containers, such as food jars, toward or away from the dead plate during loading and unloading of the retort crate.

When the retort crate is horizontally positioned adjacent the outer edge of the dead plate, a floor cylinder lies centrally below the movable bottom of the retort crate. The floor cylinder raises and lowers the bottom of the retort crate and the containers therein.

During loading of the retort crate, the horizontal positioning assembly positions the inner circumferential surface of the crate so that it lies underneath the dead plate and approximately one-half inch behind the outer edge of the dead plate. This provides extra seating space for leaners as described below. A jar load sensor indexes the floor cylinder to a proper height for loading a new layer of containers within the retort crate. The new layer of jars is then moved past the dead plate into the retort crate by the conveyor. A horizontally disposed roller drive engaging the tops of the jars is used to help fill the retort crate. Prior to lowering the newly loaded layer of jars into the retort crate, a jar clamp assembly, located above the dead plate, forces a jar clamp having a resilient lower surface onto the jars resting adjacent the outer edge of the dead plate. The horizontal positioning assembly then moves the carriage and retort crate therewith away from the dead plate approximately one-half inch to align the inner surface of the crate with the outer edge of the dead plate. The jars within the retort crate are then indexed down one level. Leaners are thus given additional seating space within the crate so that their manual repositioning is not required. The horizontal positioning assembly then moves the carriage and retort crate back to its original position wherein the inner surface of the retort crate lies below and to the rear of the outer edge of the dead plate. A new slip sheet or divider is placed on the tops of the jars, the jar clamp is raised, and the sequence is repeated.

A sweep ring, which overlies the circumference of the retort crate during loading, acts as a barrier to the containers being loaded into the retort crate. To insure that the containers do not hang up on the upper edge of the retort crate when being lowered therein, the sweep ring has a circumferential interior surface which is somewhat smaller than the inner surface of the retort crate which it overlies.

During unloading, the horizontal positioning assembly positions the retort crate so that the inner surface of the retort crate lies directly below the outer edge of the dead plate. A jar unload sensor causes the floor cylinder to index layers of containers upwardly within the retort crate. When the jars are in the proper position, that is when the bottoms of the jars are level with the top of the dead plate, the sweep ring pulls the jars past the dead plate and onto the conveyor.

The lower portion of the interior surface of the sweep ring is beveled so that the jars do not hang up on the bottom edge of the sweep ring as they are raised up into position to be unloaded. This is necessary because the sweep ring is used for both loading and unloading operations, which would otherwise require two sweep rings of different sizes.

During unloading, the jar clamp may be positioned above the dead plate allowing a small clearance above the top of the jars and the clamp. This positioning of the jar clamp causes jars which start to tip over as they are swept from the retort crate onto the dead plate to be righted by the clamp.

The present invention provides a horizontal positioning assembly which alleviates the prior art problems caused by imperfectly clamped jars which would require operator intervention. In the present invention, during loading the horizontal positioning assembly positions the retort crate so that the inner surface of the retort crate lies below and behind the outer edge of the dead plate. After one row of jars has been loaded onto the slip sheet placed between the rows of jars, the crate is slowly pushed out away from the dead plate. This allows any imperfectly clamped jars to settle in among the normally loaded jars. The retort crate is then indexed down one level of jars. The horizontal positioning assembly then jerks the retort crate back to its original position in which the inner surface lies below and to the rear of the outer edge of the dead plate. The jerking movement automatically settles the jars into place so that the operator need merely place a new slip sheet upon the top of the upper layer of jars prior to loading the next layer. Operator intervention to remove or reposition leaners is eliminated. Further, operator manipulation of the vertical height of the jars, which was previously required to jog the jars into place, is eliminated by the present invention.

To insure exact positioning of the retort crate, the horizontal positioning assembly, or HPA, includes a pair of horizontal position sensors which engage the side of the retort crate so that final positioning of the retort crate is not determined by the position of the carriage, but rather the actual position of the retort crate. Therefore, errors in positioning because of tolerance build-up within the carriage and crate are eliminated.

The HPA has an air cylinder and a hydraulic cylinder which provide the power to move the clamped carriage and crate. The air cylinder exerts a relatively weak force on the clamp compared to the greater forces exerted by the hydraulic cylinder.

The two cylinders are used primarily to provide a sufficient inward force to hold the crate in the machine while providing the large forces necessary to jerk the crate during loading operations. The air cylinder also provides an air cushion between the crate and the machine when a crate is pushed rapidly into the machine. The addition of the hydraulic cylinder action at a later time to help pull the crate in is designed to allow time for the damping action to take place and insure that the crate is always pulled completely into position.

The jar clamp of the present invention uses pressure rather than magnetic attraction to secure the jars to the edge of the dead plate. Therefore, the thickness of the lids of the jars does not affect its performance. The lower surface of the clamp is faced with resilient gripping surface, such as Goodyear "Wedgegrip" belting, to hold the jars securely in place. The clamp is adjustable and is moved by a pair of pneumatic cylinders having approximately a one-inch stroke. The one inch stroke allows the clamp to be used with runs of jars of different heights without adjustment by the operator.

During unloading the jar clamp is also used to upright jars that may start to tip over as they pass over the dead plate. To do so, the height of the clamp is adjusted so that the lower surface is about ¼ inch above the top of the jars as they pass along the dead plate. This height is set such that when a jar begins to tip during the unloading of a layer, the trailing edge of the cap of the jar contacts the lower surface of the clamp to push the jar back to the proper, upright position. No separate anti-tip device is needed.

The sweep ring performs two functions. During loading, the ring is positioned substantially over the upper edge of the retort crate. The ring provides an outer boundary for the jars during loading. The interior surface of the ring defines the boundary which is slightly inset from the inner surface of the retort crate. This is necessary so that when the jars are lowered into the retort crate, no jars hang up on the top edge of the retort crate.

During the unloading, the sweep ring sweeps the upper layer of jars from the crate and onto the conveyor. To keep any jars from hanging up on the lower surface of the sweep ring, the lower portion of the interior surface of the sweep ring is beveled. Its angled surface squeezes the jars inwardly as they pass upwardly within the ring thereby eliminating the problem.

The operating controls of the present invention are entirely pneumatic and hydraulic. Because the apparatus is often cleaned by hosing it down with water, the chance of malfunction, as may occur with electrical components, is greatly reduced.

The operating circuit disclosed uses many of the same components for the loading and unloading operations. Fewer components are needed which reduces the cost of the controls. Further, due to the unique logic circuit design and the multi-function machine components, few changes need be undertaken when converting from loading to unloading. The changes which are made can generally be made by the operator without the need to call in maintenance personnel to make the adjustments.

Other features and advantages of the invention will be apparent from the following description in which the preferred embodiment has been set forth in detail in conjunction with the accompanying drawings.

BRIEF DESCRIPTION OF THE DRAWINGS

FIG. 1 is a perspective view of the retort crate loader and unloader showing a retort crate mounted on a carriage adjacent the loader and unloader.

FIG. 2 is a somewhat diagrammatic representation of the main components of the present invention showing their directions of motion and their relationship to a retort crate.

FIG. 3a and FIG. 3b illustrate the occurrence of leaners in the prior art retort crate loaders.

FIG. 4 is a side view of the horizontal positioning assembly engaging the carriage upon which a retort crate rests.

FIGS. 5a through 5d illustrate the horizontal indexing of the retort crate to provide a settling space for leaners during loading of the retort crate.

FIGS. 6a through 6c illustrate unloading containers from a retort crate.

FIG. 7 is an enlarged isometric view of the jar unload sensor assembly.

FIG. 8 is an enlarged view of the jar load sensor assembly.

FIGS. 9A-9C are control circuit diagrams.

FIGS. 10A-10C are power device diagrams with control inputs referenced to FIGS. 9A-9C.

DETAILED DESCRIPTION OF THE PREFERRED EMBODIMENT

Referring now to FIGS. 1 and 2 the retort crate loader and unloader of the present invention includes generally a frame 2, a conveyor 4, and dead plate 6 at the end of the conveyor, a jar clamp assembly 8 mounted above the dead plate, a horizontal positioning assembly (or HPA) 10 and a floor cylinder 12.

The conveyor is of conventional design and can be particularly adapted to the type of containers or jars 14 to be used. A drive roller 16 is mounted to the frame above the conveyor and is used to pack the jars within the retort crate during loading operations. Its height above the conveyor is adjustable via a hand wheel 18 which can be adjusted by the operator. A second conveyor, not shown, is typically used in conjunction with conveyor 4 during loading and unloading operations.

The jar clamp assembly is likewise mounted to the frame above the dead plate. Jar clamp assembly 8 includes a pair of hydraulic jar clamp cylinders 20 which control the vertical movement of a jar clamp 22 over the dead plate. The stroke of the jar clamp cylinders is sufficiently great, for example one inch, so that a range of jar sizes can be accommodated by the apparatus without modification. Dead plate 6 is mounted to the frame so that its upper surface 24 is generally parallel with the upper reach 26 of the conveyor. The dead plate has an inner edge 28 adjacent the conveyor and a arcuate outer edge 30 conforming to the shape of the retort crate 32 as described below.

The retort crate is of standard design having cylindrical sidewalls 34, a moveable bottom 36 and a circumferential top edge 38 surrounding an open top. Sidewalls 34 have an inner surface 40 and an outer surface 42 (see FIG. 5A). The crate is mounted in a carriage 44. The carriage has one steerable wheel 46 and two fixed wheels 47 attached to a triangularly shaped carriage frame 48. Frame 48 is made of L-shaped angle iron. The retort crate is kept from slipping off the carriage by three upwardly extending brackets 50. Turning now to FIGS. 2 and 4, the horizontal position assembly will be discussed.

Horizontal position assembly 10 is mounted to the frame in an area generally beneath the conveyor and dead plate. Assembly 10 includes an articulated toggle clamp 52 actuated by a clamp cylinder 54. In FIG. 2 the toggle clamp is shown capturing a portion of the carriage frame between clamp arm 55 and clamp surface 56. In FIG. 4 the toggle clamp is shown open with the clamp-cylinder retracted and clamp arm 55 generally horizontal.

Horizontal position assembly 10 also includes a pair of horizontal positioning sensors 58, 60. These sensors engage the outer surface of the retort crate. The position sensors are placed to indicate when the retort crate is properly situated. In this application the directions in and out will be taken to mean horizontal directions parallel to the path of the conveyor with the "in" meaning from the dead plate towards the conveyor and "out" meaning from the conveyor towards the dead plate. A third positioning sensor, reset valve 115 shown only in FIG. 9B, is operated when the HPA is in the full out position and is located between the air and hydraulic power cylinders. Reset valve 115 is used primarily to indicate the end of a complete cycle and to reset certain portions of the air logic, as discussed in more detail below.

The HPA also includes a hydraulic power cylinder 62 and a pneumatic power cylinder 64. These power cylinders are used to move toggle clamp 52, clamp cylinder 54, sensors 58, 60 and a carriage mounted crate therewith in the horizontal in and out directions.

Once the retort crate is positioned adjacent the dead plate, as seen in FIGS. 1 and 2, floor cylinder 12 lies generally centrally beneath the movable botton 36 of the retort crate. Three sets of vertical position sensors are used during loading and unloading the retort crate in conjunction with the floor cylinder. Two of these sensors determine when the floor cylinder is either in its fully down or fully up position. Fully down sensor 131 (see FIGS. 9C and 10A) typically engages the floor cylinder platen 66 when the floor cylinder is at its fully down position. Fully up sensor 130 (see FIGS. 9B and 10A) is the type which is connected by a suitable length cord so that when moveable bottom of the crate is level with the deadplate, the fully up sensor is activated.

A jar unload sensor assembly 68, shown in FIG. 7, is mounted to the frame near a control panel 70. Unload sensor assembly 68 includes a horizontally extending arm 72 attached to a vertically extending bar 74, the bar slideably mounted within correspondingly sized holes in a pair of plates 76. The sensor arm 78 of jar unload sensor 80 rides against the lower end of bar 74. The distal end 79 of arm 72 extends inwardly over the top edge 38 of the retort crate so that as the layers of jars separated by slip sheets 82 are indexed upwardly by floor cylinder 12, distal end 79 engages the upper most slip sheet and is forced upwardly thereby. The upward movement of arm 72 causes sensor arm 78 to move upwardly. When the top of the slip sheet, and thus the bottoms of the upper level of jars in a retort crate, is level with upper surface 24 of the dead plate, sensor 80 indicates that the jars are "in position" causing the floor cylinder to halt its upward motion.

Sweep ring 84, shown best at FIGS. 1, 2 and 6A–6C includes an angle iron backbone 86 and a beveled positioning block 88 attached to the inner circumference of backbone 86. The backbone and positioning block have a semi-circular shape for overlying the cylindrical retort crate. As shown best in FIG. 6A, an internal beveled edge 90 of block 88 lies immediately above inner surface 40 of the retort crate. As the jars move upwardly during unloading, the top edge of the jars engage surface 90 and are gathered or squeezed somewhat towards the center of the retort crate. Such positioning likewise insures that the jars, when loaded into the retort crate, do not hang up on circumferential edge 38 of the crate. During loading operations, as more fully discussed below, vertical surface 92 of block 88 positions the containers inwardly of the inner surface 40 of the retort crate so that when the jars are lowered within the retort crate the containers next to surface 40 do not hang up upon top edge 38.

Turning now to FIGS. 3A and 3B, an aspect of prior art retort crate loaders will be addressed. In FIG. 3A a top level 94 of jars have been loaded into a retort crate. Jar 96 is imperfectly captured between clamp 22' and dead plate 6' so that as level 94 is lowered with the retort crate, jar 96 begins to fall within layer 94 because clamp 22' cannot hold the jar. Thus, jar 96 becomes a "leaner" which must be removed or repositioned by the operator, an inefficient process.

In FIGS. 5A–5D the loading sequence of the apparatus of the present invention is disclosed. In FIG. 5A a new level 98 of jars has just been urged onto slip sheet 82. Jar clamp 22 is shown with its resilient clamping surface 102 capturing a jar 104 between dead plate 6 and clamp 22. It should be noticed that jar 106 is in approximately the same position relative to the dead plate as was jar 96 shown in FIG. 3a. It should also be noted that surface 40 lies inwardly of arcuate outer edge 30 of the deadplate.

In FIG. 5B retort crate 32 has been moved horizontally out, or away from the dead plate by hydraulic power cylinder 62. In FIG. 5C layer 98 has begun indexing down one level. Because when layer 98 was initially loaded into the retort crate as shown in FIG.

5A, there is a space between jar 106 and surface 40. In FIG. 5D, layer 98 is shown fully indexed down and horizontally indexed in or towards the dead plate.

It should be noted that dead plate 6 has a cut-out portion 108 to accommodate the tops of the jars. It should also be noted that upper surface 24 of the dead plate is generally parallel with the top of slip sheet 82 during loading. If slip sheet 82 was thicker than dead plate 6, no cut-out portion 108 would be needed.

FIGS. 1 and 8 illustrate the index down container sensor assembly 141. Assembly 141 is mounted to a support arm 143 and includes a height sensor arm 146 pivotally mounted to arm 143 via a shaft 145. Sensor arm 146 includes an arcuate side 148 for engaging the tops of the jars during loading operations as described below. At the other end of shaft 145 an arm 150 extends radially therefrom and engages a follower 152, which is biased against arm 150. Follower 152 activates an index down limit value 129 mounted to support arm 143. As arm 146 pivots about shaft 145, arm 150 moves follower 152 so that when the jars in the crate are at a proper height, valve 129 is activated causing an index down sensor air cylinder 144 to retract thus pivoting arcuate side 148 up and away from the jars.

In FIGS. 9A–9C relay valves are shown along the right-hand side with their corresponding like-numbered switches located in the circuit. Relay valves (RV) 1 through RV10, RV12, RV14, RV15 and RV18–RV21 are of a type such as NUMATROL #RA5-1103. RV11, RV13, RV16 and RV17 are of a type such as NUMATROL #RA5-1101. The bi-directional shuttle valves and flow restrictors, unmarked, are available commercially.

The following conventions should be noted regarding FIGS. 9A–9C. The FIGS. are drawn so that the relay valves are in the B position. The relay valves with a square box around them are bi-stable, that is they only need a pulse to activate them from B to A to B. The relay valves with a circle around them are monostable, that is they need a signal to make A, otherwise they return to B.

Operating the retort crate loader unloader of the present invention as an unloader proceeds generally as follows. For the purpose of this discussion, reference is made primarily to FIGS. 9A–9C and 10A–10C.

Unload Sequence

The following initial conditions will be assumed for the unload sequence described below. A loader/unloader select switch 120 in the "unloader" position and take away conveyor switch 122 in "run" position so that an unload conveyor drive 160 is activated, floor cylinder 12 fully down, sweep ring 84 fully out, pneumatic power cylinder 64 out, toggle clamp 52 open, control air switch 128 in "on" position, hydraulic pump on, crate retract switch 126 in "auto" position, and sweep ring stop air cylinder 140 retracted.

First, an operator wheels a loaded crate into position adjacent the dead plate. The forward portion 110 of carriage frame 48 (see FIG. 2) activates a carriage sensing limit valve 112 (see FIG. 4) by pressing against surface 114. Hydraulic clamp cylinder 54 activates clamp 52 to secure portion 110 of frame 48 between arm 55 and surface 56. Pneumatic power cylinder 64 then begins to pull the clamped carriage in and releases pneumatic power cylinder reset valve 115. If pneumatic cylinder 64 fails to pull the crate in within a predetermined time, such as can occur when the crate is heavily loaded, hydraulic power cylinder 62 is activated via time relay valve 158 and also acts to pull the crate in. As the crate is pulled in, the side of the crate first engages sensor arm 57 of sensor 58 and then engages sensor arm 59 of sensor 60. Hydraulic cylinder 62 then stops. To insure the crate does not move during operation, pneumatic cylinder 64 remains activated to keep the crate in position.

A crate retract switch 126 is provided to modify the load sequence in the event that jars are consistently being caught by the deadplate. When the switch is on "manual", the inward motion of the HPA is delayed until retract crate push button 154 is pushed. Switch 126 is left on "auto" when unloading.

The operator now steps on a foot switch 117 causing hydraulic cylinder 62 to push the crate out. The pneumatic cylinder is turned off while the hydraulic cylinder is acting, otherwise, at the end of the stroke when the hydraulic cylinder is turned off, the pneumatic cylinder would cause the crate to drift back to the inward position. The operator is required to keep his foot on the foot switch during the unloading operation. If the switch is released, the operation of the machine stops.

Sensors 60, 58 are made in order as the crate moves out. When sensor 58 is made, hydraulic cylinder 62 stops and holds the crate in place with surface 40 of the crate generally aligned with edge 30 of the dead plate as in FIG. 6A.

The floor cylinder begins to raise first releasing the fully down sensor 131 and then last row loaded sensor 132 is activated. Note that these actions occur only when unloading the first layer of jars. As the jars move up, the slip sheet under the upper level of jars engages distal end 79 of sensor arm 78. See FIGS. 6B and 7. When the top of the divider is level with upper surface 24 of the dead plate, jar unload sensor 80 is activated stopping floor cylinder 12. Hydraulic cylinder 62 and pneumatic cylinder 64 then pull the crate in making sensors 58 and 60.

A sweep ring air cylinder 116 connected to sweep ring 84 begins to sweep the upper level of jars from within the retort crate, past the dead plate and onto the conveyor. At the beginning of the sweep, which is at a slow speed, a ring fully out sensor 133 is released to reset jar unload sensor 80. After sweep ring 84 has completed a portion of its sweep, a high speed switch 135 is activated to shift air cylinder 116 to high speed. When sweep ring 84 has completed sweeping the containers onto the conveyor, a full sweep limit valve 134 is tripped to stop air cylinder 116. Air cylinder 116 then begins to return releasing full sweep limit valve 134 and operating high speed switch 135. When ring fully out sensor 133 is made, air cylinder 116 stops, the pressure from pneumatic power cylinder 64 is released and hydraulic power cylinder 62 moves the crate out.

The steps in the three paragraphs above are repeated for each layer until the last layer. The operation during unloading the last layer is as follows.

Sensors 60, 58 are made as the crate moves out. When sensor 58 is made, hydraulic cylinder 62 stops and holds the crate in place with surface 40 of the crate generally aligned with edge 30 of the dead plate. Floor cylinder 12 raises the last layer of jars until sensor arm 78 activates jar unload sensor 80; the fully up sensor 130 is also activated at this time to signal that the last layer is being unloaded. Power cylinders 62, 64 pull the crate in making sensors 58, 60. The jars are then swept from the retort crate as described above and shown in FIGS. 6B and 6C. When the sweep ring makes full sweep limit valve 134, sweep ring air cylinder 116 stops and floor cylinder 12 lowers releasing fully up sensor 130. Sweep ring air cylinder 116 and sweep ring 84 move out releasing full sweep limit valve 134, operating high speed switch 135 and making ring fully out sensor 133. The floor cylinder operates the last row loaded and fully down sensors 132, 131. Clamp cylinder 54 opens allowing arm 55 to pivot away from surface 56 thus releasing portion 110 of carriage frame 48. The operator then pushes crate eject button 118 causing power cylinder 64 to extend releasing horizontal position sensors 60, 58 and making pneumatic power cylinder reset valve 115. Limit valve 112 is released as the retort crate moves away from the apparatus.

The above unload sequence is repeated for each filled retort crate. It should be noted that the operator needs to do very little during the unloading operation other than step on foot switch 117 and remove the dividers.

Load Sequence

The initial conditions for loading operations are as follows: Load/unload select switch 120 in load position, sweep ring air cylinder 116 (and sweep ring 84) fully out, pneumatic power cylinder 64 out, toggle clamp 52 open, no crate in machine, control air switch 128 "on," crate retract switch 126 on "auto," jar clamp 22 is down (towards deadplate 6), and sweep ring stop air cylinder 140 extended.

The operator moves an empty crate into position making carriage sensing limit valve 112. Clamp cylinder 54 activates toggle clamp 52 to clamp the carriage against surface 56. Power cylinder 64 begins to retract pulling the crate in and releasing reset valve 115. If pneumatic cylinder 64 fails to pull the craft in within the predetermined time, time relay valve 158 times out causing hydraulic power cylinder 62 to also pull the crate in. Position sensors 58, 60 are consecutively made. Floor cylinder 12 raises platen 66 releasing fully down sensor 131 and operating last row loaded sensor 132. When floor cylinder 12 is fully up, fully up sensor 130 is made and the floor cylinder stops.

The operator steps on foot switch 117 to begin to load the layer. Jar clamp cylinder 20 raises, roller drive 136 starts to turn drive roller 16 and load conveyor drive 138 turns conveyor 4 so that the jars are loaded into the crate. Sweep ring air cylinder 116 then pulls the sweep ring in a short distance (for example ½") until adjustable ears on the sweep ring (not shown) come in contact with the sweep ring stops (which are always extended during loading operations) to stop the motion of the sweep ring at a preset position. This slight repositioning helps to insure that the jars do not hang up on the edge of the retort crate when they are lowered.

When the layer is full the operator releases foot switch 117. Jar clamp air cylinder 20 lowers jar clamp 20 capturing the jars near edge 30 of plate 6 between the dead plate and the jar clamp. Roller drive 136 and load conveyor drive 138 stop loading jars and cylinder 116 returns the sweep ring the short (½ inch) distance out. The operator then pushes an index down push button 142 whereupon index down sensor air cylinder 144 extends allowing height sensor arm 146 to pivot downwardly so that its arcuate side 148 contacts the tops of the jars in the newly loaded layer; hydraulic power cylinder 62 pushes the crate out releasing sensor 60 and then sensor 58. When sensor 58 is released, the crate stops and the floor cylinder begins moving down. At this time any "leaners" are accommodated in the additional space provided in the area which was previously under the dead plate. When the jars are at a proper height, arm 150 activates index down limit valve 129 to stop the floor cylinder's downward motion. Hydraulic power cylinder 62 jerks the crate in making sensor 58 and then sensor 60. The jerking helps to settle the jars in place so that operator intervention is not needed. Cylinder 62 stops and index down sensor air cylinder 144 retracts thus pivoting sensor arm 146 up out of the way of a new level of jars. The operator then places a new divider over the jars.

The steps outlined in the above two paragraphs are repeated until the last layer is loaded. On the last layer, platen 66 of floor cylinder 12 activates last row loaded sensor 132. After the last layer is loaded the operator pushes index down push button 142 and floor cylinder 12 lowers releasing last row loaded sensor 132. When the floor cylinder makes fully down sensor 131, the floor cylinder stops and clamp cylinder 54 opens toggle clamp 52. The operator then pushes crate eject push button 118 whereupon pneumatic power cylinder 64 extends out releasing sensor 60 and then making reset valve 115. The crate then leaves the clamp assembly releasing carriage sensing limit valve 112. Modification and variation can be made to the disclosed embodiment without departing from the invention as defined in the following claims.

What is claimed is:

1. Apparatus for loading containers into a retort crate, said retort crate mounted on a movable carriage, said containers arranged in said retort crate in a plurality of levels, said retort crate having a movable bottom member and an open top, said top bounded by a top edge, comprising:
   a container conveyor means including a dead plate at one end, said dead plate having an inner edge adjacent said one end and an outer edge opposite said inner edge;
   means for positioning said carriage and retort crate therewith to a first position, said crate in said first position having a portion of said top edge below said dead plate and between said inner and outer edges of said dead plate;
   means for vertically indexing said movable bottom member to a plurality of load positions;
   a jar clamp mounted for vertical movement above said dead plate so that containers situated on said dead plate adjacent the outer edge thereof can be secured between said jar clamp and said dead plate; and
   means for horizontally indexing said retort crate between said first position and a second position, said second position being farther from said inner edge of said dead plate than said first position, whereby a settling space for said containers is provided within said crate.

2. The apparatus of claim 1 further comprising:
   a guard located above and along a portion of said top edge of said crate to keep the uppermost layer of said containers within said crate as said containers are loaded into said crate.

3. The apparatus of claim 1 wherein said container conveyor means includes a movable belt located next to said inner edge of said plate.

4. The apparatus of claim 1 wherein a horizontal movement assembly comprises said carriage and retort crate positioning means and said horizontal indexing means.

5. Apparatus for loading containers into a retort crate, said retort crate mounted on a movable carriage, said containers arranged in said retort crate in a plurality of levels, said retort crate having a movable bottom member and an open top, said top bounded by a top edge, comprising:
- a container conveyor means including a dead plate at one end, said dead plate having an inner edge adjacent said one end and an outer edge opposite said inner edge;
- means for positioning said carriage and retort crate therewith to a first position, said crate in said first position having a portion of said top edge below said dead plate and between said inner and outer edges of said dead plate, said positioning means including a carriage clamping means and means for sensing the horizontal position of said retort crate;
- means for vertically indexing said movable bottom member to a plurality of load positions;
- a jar clamp mounted so that containers situated on said dead plate adjacent the outer edge thereof can be secured between said jar clamp and said dead plate; and
- means for horizontally indexing said retort crate between said first position and a second position, said second position being farther from said inner edge of said dead plate than said first position, whereby a settling space for said containers is provided within said crate.

6. The apparatus of claim 5 wherein said positioning means includes first and second means for horizontally moving said clamping means and said carriage and retort crate therewith.

7. The apparatus of claim 5 wherein said horizontal position sensing means includes first and second means for engaging the side of said retort crate as said carriage clamping means positions said carriage and retort crate therewith.

* * * * *